HYBRID JUNCTION WIDEBAND FM DEMODULATOR

Filed Jan. 4, 1965

INVENTORS:
JAMES A. HALL,
HARRY J. PEPPIATT,
BY I David Blumenfeld
THEIR ATTORNEY.

3,404,346
HYBRID JUNCTION WIDEBAND FM DEMODULATOR

James A. Hall and Harry J. Peppiatt, Lynchburg, Va., assignors to General Electric Company, a corporation of New York Filed Jan. 4, 1965, Ser. No. 422,924
7 Claims. (Cl. 329—116)

ABSTRACT OF THE DISCLOSURE

A wideband, FM demodulator in which the incoming FM signal is split into two equal, in-phase components. One component is coupled to a lossless linear phase-shift network consisting of a transmission line having an odd multiple quarter-wave length frequency $f_c$ to shift the phase of one component by an odd multiple of 90°, and applied to one input port of a wideband hybrid constructed of a plurality of distributed line transformers. The other signal component is applied to the other input port of the hybrid. The output signals appearing at the two output ports of the hybrid are respectively the sum and difference of the two signal components applied to the input ports. The sum and difference signals are detected differentially in a pair of envelope detectors to produce a varying unidirectional output signal the magnitude and sign of which varies as a function of the frequency deviation of the input signal from $f_c$.

This invention relates to a wideband demodulator and, more particularly, to a linear frequency discriminator for wideband FM systems.

In frequency modulating systems, the received signal is demodulated and the intelligence extracted by converting the frequency variations of the modulated signal to amplitude variations. With wideband FM where the bandwidth of the signal may be as much as thirty percent (30%) of the center frequency, the performance requirements for the demodulator or discriminator are very stringent. The discriminator should have high linearity over a wide frequency range, low group delay or distortion, good stability and sensitivity. Unfortunately, presently available discriminators are not capable of meeting these needs for wideband systems. A commonly used class of frequency discriminators is the so-called balanced detector type. In one of its forms, it includes two resonant circuits, one tuned above and one below the center frequency $f_c$ of the modulated signal with the two resonant circuits and their associated diode detectors connected differentially to produce the desired output. By carefully constructing and adjusting a discriminator of this type, a reasonable amount of linearity can be obtained. However, the linearity is limited to a narrow bandwidth. If an attempt is made to increase the bandwidth by lowering the Q of the resonant circuit, for example, the sensitivity of the discriminator suffers. Also, the tuned circuits of such a discriminator by virtue introduce group delay or envelope delay distortion. This distortion occurs when the rate of change of phase shift with frequency of the discriminator is not constant over the entire frequency range. It is obvious that where an extremely wideband signal, i.e., 10 megacycles or more, must be demodulated, the use of tuned circuits inevitably introduces delay distortion. Hitherto, demodulation of wideband FM required the use of delay equalizers in conjunction with discriminators of this type to correct or compensate for this distortion. While this solves the problem to a certain extent, delay equalization is complex and expensive. Hence, this type of discriminator, using tuned circuits resonant above and below the center frequency, has serious limitation where wideband FM signals must be demodulated.

Another well known and widely used frequency discriminator is the so-called phase shift discriminator which operates on the principle that the voltage across the secondary of a tuned transformer is in quadrature with the primary voltage at resonance and departs from the quadrature relationship *nearly* linearly on both sides of resonance. It has been found that this linearity exists over a very narrow band of fequencies since once more a resonant or tuned circuit is being utilized. Furthermore, for wide bandwidths, discriminators of this type require extremely high coupling factors between the primary and secondary of the discriminator transformer which involves substantial problems in the design and fabrication of the discriminator transformers. However, even if the transformer is properly constructed, there are still linearity problems and group delay distortion problems which require the use of delay equalizers with the attendant expense and complexity of the equipment. Hence, a need exists for a discriminator which is highly linear, has good sensitivity, and negligible group delay over a very wide range of frequencies.

It is a primary object of this invention, therefore, to provide a wideband frequency discriminator having high linearity over the entire frequency range.

Another object of this invention is to provide a linear wideband frequency discriminator which does not utilize any resonant circuits.

Yet another object of this invention is to provide a wideband phase shift type balanced descriminator which minimizes group delay distortion.

Other objects and advantages of the instant invention will become apparent as the description thereof proceeds.

The various objects and advantages of the instant invention are realized by providing a wideband hybrid of the distributed transmission line type. The frequency modulated input, before being applied to the hybrid, is split into two equal signals, one which is passed through a lossless linear phase shift circuit (which is adjusted to have an odd multiple of ninety degrees (90°) phase shift at $f_c$, the center frequency of the FM band), and another which is not altered in any way. These two outputs are applied to appropriate ports of the hybrid. The hybrid provides two output signals, one of which is the sum of the two inputs to the hybrid, and the other of which is the difference of the two inputs. At $f=f_c$, the sum and difference signals are equal in amplitude and ninety degrees (90°) out of phase. The sum and difference components are detected differentially and cancel at $f=f_c$ so that the output of the discriminator is zero. As the frequency of the modulated signal departs from the center frequency $f_c$, the two input signals are no longer in quadrature so that the sum and difference signals are no longer equal although still ninety degrees (90°) apart. Hence, when detected, the magnitude and sign of the output signal represents the amount and direction of departure from the quadrature relationship and reflects exactly the amount and direction of departure of the FM signal from the center frequency $f_c$. In one form, the linear phase shift network is a three-quarters wave length transmission line which is terminated in its characteristic impedance $Z_0$ by the hybrid so that the line is non-resonant. Consequently, the phase shift variations are substantially linear over a large frequency range.

The novel features, which are believed to be characteristic of this invention, are set forth, with particularity, in the appended claims. The invention itself, however, both as to its organization and mode of operation, together with further objects and advantages, may best be understood by reference to the following description taken in connection with the accompanying drawings in which:

Figure 1:
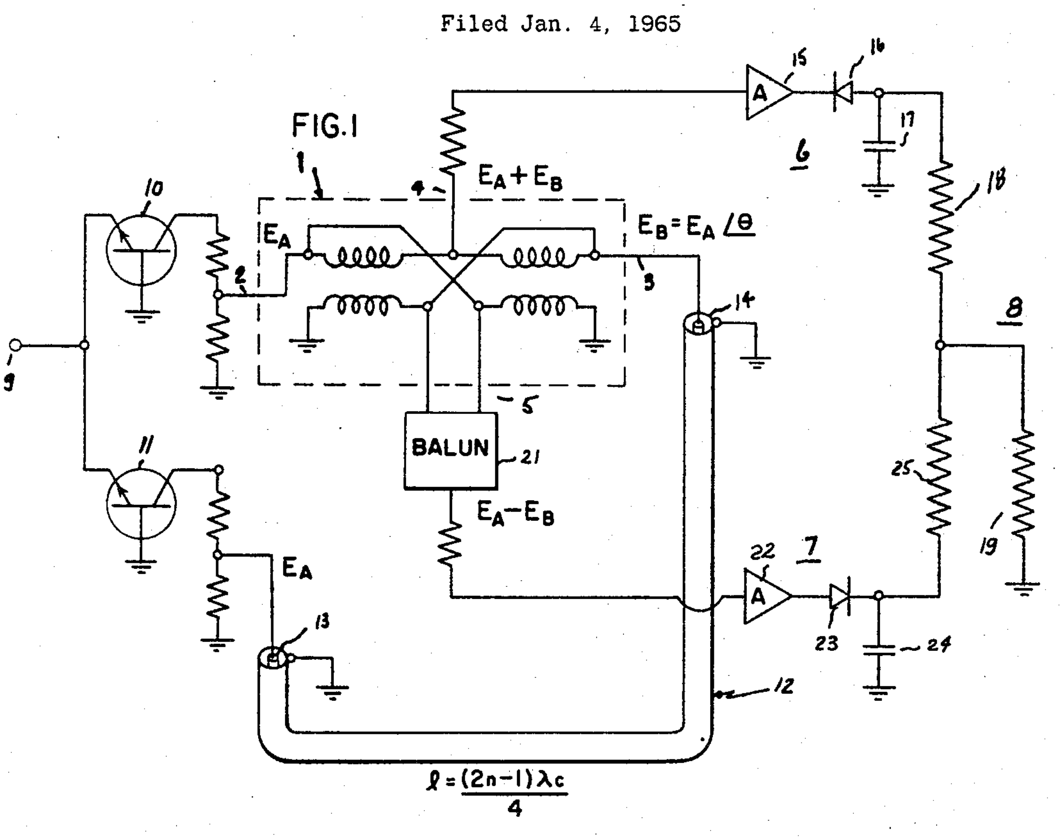
FIG. 1 illustrates, in block diagram form, the wideband frequency discriminator of the instant invention which is highly linear and has negligible group delay.

The discriminator includes a wideband hybrid 1 having two input ports 2 and 3 and two output ports 4 and 5. The FM signal is simultaneously impressed on input ports 2 and 3 in a predetermined quadrature phase relationship and two outputs, which are respectively the vectorial sum and the vectorial difference of the two input signals, are taken from output ports 4 and 5. The sum and difference signals are detected in detecting networks shown schematically at 6 and 7 and differentially combined in output network 8. The resultant output is, therefore, the difference of the two signals, and its sign and amplitude is, therefore, proportional to the magnitude and direction of the frequency deviation of the modulated signal from $f_c$.

In order to achieve linearity over a wide frequency range, the circuit for producing the quadrature input to the hybrid is a nonresonant linear phase shifting device so that the phase shift of the signal is split into two equal components, and one of the components is passed through a linear phase shifter shown as a transmission line which is an odd quarter wave length long at the center frequency $f_c$, i.e., $$l=\frac{(2n-1)\lambda c}{4}$$

to produce a signal component which is shifted two hundred seventy degrees (270°) at $f_c$ and is in quadrature with the other signal component. Thus, the incoming FM signal is impressed on input terminal 9 which is connected to the input electrodes of two identical common-base transistor stages shown generally at 10 and 11. The signal components are thus equally amplified in the transistor amplifier stages and are respectively coupled through suitable voltage dividing networks to the hybrid input ports 2 and 3. The FM signal component $E_A$ at the voltage divider associated with amplifier 10 is applied directly to input port 2. The signal component $E_A$ at voltage divider associated with amplifier 11 is applied to input port 3 over a nonresonant transmission line to produce a phase shifted signal $E_B=E_A\angle\theta$, where $\theta$ is equal to two hundred seventy degrees (270°) at $f=f_c$. The nonresonant phase shifting transmission line is shown to be a coaxial line 12 having an inner conductor 13 connected at one end to the voltage divider and to input port 3 at the other end. The outer conductor 14 of the coaxial line is suitably grounded, and the electrical length of coaxial line 12 is equal to $$\frac{(2n-1)\lambda c}{4}$$

Preferably, the electrical length of the transmission line is three-quarters of a wave length at the frequency $f_c$, although it will be obvious that it may be a quarter wave or any odd multiples of a quarter wave length. The output signal at port 4 is equal to the vector sum of the input voltages $E_A$ and $E_B$ whereas a difference voltage $E_A-E_B$ appears at output port 5. For the case where a three-quarters line is used and $f=f_c$, $E_B$ lags $E_A$ by two hundred seventy degrees (270°) and is, therefore, in quadrature with $E_A$, and the vector sum $E_A+E_B$, therefore, lags $E_A$ by three hundred fifteen degrees (315°). Since the output at port 5 is the vectorial difference of the two components, $-E_B$ is one hundred eighty degrees (180°) out of phase with $+E_B$ and leads $E_A$ by ninety degrees (90°). The difference vector $(E_A-E_B)$, therefore, leads $E_A$ by forty-five degrees (45°). $E_A+E_B$ and $E_A-E_B$ are individually detected networks 6 and 7 to produce amplitude variations which are proportional to the frequency deviations of the signal.

The sum voltage $E_A+E_B$ at output port 4 may be detected directly or amplified in one or more amplifying stages 15 and then detected in a network including the diode means shown generally at 16 and a by-pass capacitor 17 which shunts the carrier $f_c$ to ground. The rectified signal is applied through resistor 18 to a common load resistor 19. The difference signal at output port 5, which is a balanced output, is coupled to a balance-to-unbalance network or Balun, shown generally at 20 to convert the signal from one which is balanced with respect to ground to one which is unbalanced. The difference signal is amplified in one or more amplifying stages and is detected in a network including diode 23 and carrier by-pass capacitor 24. The detected signal is applied through resistor 25 to common load resistor 19. It will be apparent that, with the detecting diodes oppositely poled, the sum and difference signals are applied differentially to the common load resistor thereby producing a differential current flow through the load resistor 19. Thus, if the two signals ($E_A+E_B$ and $E_A-E_B$) are of the same magnitude, the output signal across resistor 19 is zero since the currents flowing therethrough are equal and opposite in direction. However, as the frequency of the signal departs from $f_c$, thereby producing a phase shift in the signal transmitted over nonresonant transmission line 12, the signal components $E_B$ and $-E_B$ are no longer in quadrature with $E_A$, varying the phase and amplitude of the sum and difference vectors. The voltage across output load 19 varies in magnitude and sign in a manner corresponding to the direction and the amount of the phase shift which component $E_A$ undergoes in coaxial line 13. This in turn reflects the direction and amount of the departure of the frequency of the FM signal from $f_c$.

It will be obvious that the detectors 6 and 7 may be of any well-known configuration and that the simple arrangement shown here is for purposes of explanation only. More complex arrangements may be utilized as long as its characteristics are consistent with the linearity and other operational requirements of the discriminator.

Figure 2:
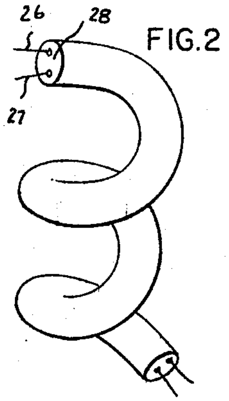
FIG. 2 is a fragmentary perspective of a distributed line transformer which is utilized in constructing the wideband hybrid.
Figure 5:
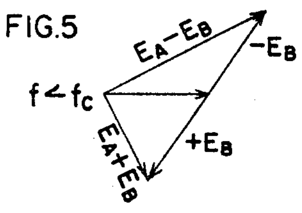

Hybrid 1 has wideband characteristics and a substantially flat response over a bandwidth of at least two decades. The hybrid is constructed of a plurality of distributed line transformers (DLT's) connected in a manner presently to be described. The distributed transformers are characterized by an extended high frequency response resulting in very broadband performance by the entire hybrid. In conventional transformers, the inter-winding capacity resonates with the leakage inductance producing loss peaks in the transformer. Consequently, the high frequency response of conventional transformers is limited. In transmission line transformers, or distributed line transformers as they are sometimes referred to, the windings are so arranged that the interwinding capacity is made a component of the characteristic impedance of a transmission line and consequently forms no resonances which limit the bandwidth of the devices in any substantial way. For the same reason, the windings can be spaced closely together thereby maintaining good coupling. As a result, transformers and hybrid devices can be constructed in this way to have extremely good high frequency response. FIG. 2 is a fragmentary showing of a DLT and is one in which the primary and secondary are formed by a transmission line of properly chosen characteristics. Thus, as shown in FIG. 2, twin leads 26 and 27, shown encased in any suitable insulating material 28, are wound in pairs over a core, not shown, which may be torodial or of any other shape. Twin leads 26 and 27 thus form a transmission line and simultaneously constitute the primary and secondary of the transformer. The inter-winding capacity, as pointed out previously, which limits the response of normal transformers, now forms part of the distributed parameters of the transmission line and has no effect on the high frequency response. As long as the source and load impedances presented to the distributed line transformers section are of the same order of magnitude as the characteristic impedance of the line, DLT's operate effectively without having the usual frequency limitations of transformers. For a further and more thorough discussion of distributed line transformers and of hybrid constructions, reference is hereby made to the article entitled "Broadband Transformers," by C. L. Ruthroff, Proceedings of the IRE, Volume 47, No. 8, August 1959, pages 1337 through 1342.

By constructing the individual windings 29 and 30, 31 and 32 of hybrid 1 of distributed line transformers, hybrid 1 has a flat response over more than two decades. The hybrid thus consists of two distributed line transformers connected, as shown in FIG. 1, with primaries 29 and 31 and secondaries 30 and 32. Primary 29 has one terminal connected to input port 2 and the other to the sum of output port 4. One terminal of primary 31 is connected to input port 3 and the other to sum output port 4. Primary windings 29 and 31 are also cross-connected to the ungrounded terminals of the secondary windings 30 and 32 which, in turn, form part of the difference output port 5.

Figure 3:
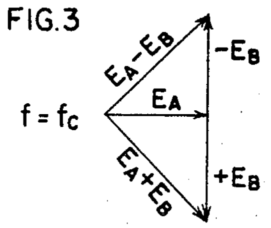
FIGS. 3–9 are vector diagrams useful in understanding the operation of the frequency discriminator.
Figure 6:
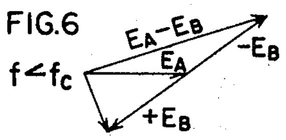

The manner in which the discriminator of FIG. 1 operates may be understood by reference to the vector diagrams of FIGS. 3–9. FIG. 3 illustrates by means of a vector diagram the relationship of the input signals and the vectorial sum and difference signals when the frequency of the modulated input signal is equal to the center frequency, i.e., $f=f_c$. The input signal component at input port 2 is shown by the vector $E_A$. With $f=f_c$, the coaxial transmission line 12 is exactly three quarters of a wave length long, and the signal at port 3 is shifted two hundred seventy degrees (270°) and is, therefore, in quadrature with $E_A$ as illustrated by the vector $+E_B$. The signal at sum port 4 is, therefore, shown by the vector $E_A+E_B$. The output at difference port 5 is equal to $E_A-E_B$. Since $-E_B$ must, by definition, be one hundred eighty degrees (180°) out of phase with $+E_B$ it can be seen that $-E_B$ is also in quadrature with $E_A$ as shown by vector $-E_B$. The vector $E_A-E_B$ is equal in magnitude to the sum vector and is exactly ninety degrees (90°) out of phase with it. Since the two vectors are equal the detected outputs from diodes 16 and 23 are approximately equal in magnitude since it is assumed that the constant of proportionality of the two networks is approximately equal. Since the two signals are detected differentially and applied to common output resistor 19 the two currents flowing through the resistor are equal and in opposite directions so that the output voltage is zero.

Figure 4:
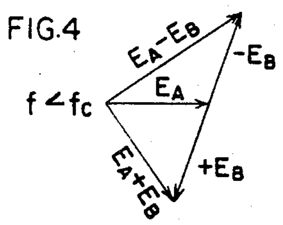
Figure 7:
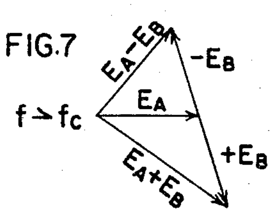

If the frequency deviation of the modulated signal is such that the instantaneous frequency is less than $f_c$, transmission line 12 is now less than three-quarters of a wave length at the frequency of the signal, and $E_B$ is shifted in phase by an amount less than two hundred seventy degrees (270°). Therefore, as seen in FIG. 4, $+E_B$ at input port 3 is no longer in quadrature with $E_A$. Similarly, $-E_B$, which is one hundred eighty degrees (180°) out of phase with $+E_B$, is also no longer in quadrature with $E_A$. The sum signal $E_A+E_B$ is reduced whereas the difference signal $E_A-E_B$ increases in magnitude. The detected sum and difference signals no longer cancel, and voltage is developed across output resistor which is proportional to the difference in the magnitudes of the sum and difference signal and the sign of which is such as to indicate that the difference signal $E_A-E_B$ is larger and that the frequency of the modulated signal is less than $f_c$. As the frequency departure of the $f_c$ increases, the sum signal, as may be seen from FIGS. 5 and 6, becomes progressively smaller while the difference signal becomes progressively larger. At a frequency where the length of the coaxial line is a half wave length, the sum signal component $E_A+E_B$ reaches its maximum value of $2E_A$ and similarly the output voltage of one polarity across resistor 19 reaches a maximum.

Figure 9:
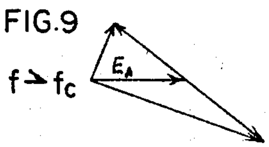
Figure 8:
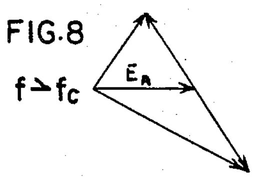

On the other hand, if the frequency deviation is such that the instantaneous signal frequency is greater than $f_c$, the length of nonresonant coaxial line 12 is greater than three-quarters of a wave length and the signal $E_B$ is shifted by more than two hundred seventy degrees (270°). As a result, the $+E_B$ and $-E_B$ vectors assume the positions shown in FIG. 7, with both vectors again not in quadrature with vector $E_A$. However, now the sum vector signal increases with frequency changes, and the difference vector becomes smaller. As a result, the sign of the voltage across common output resistor 19 reverses, and the magnitude is proportional to the frequency deviation of the modulated signal. As seen in FIGS. 8 and 9 as the frequency deviation increases, the difference vector $E_A-E_B$ becomes progressively smaller, and the sum vector becomes progressively larger until at a frequency where the length of the coaxial line is equal to a wave length, the difference vector goes to zero and the sum vector reaches its maximum value which is equal to $2E_A$.

Since the phase shifting element is a nonresonant transmission line, such as the coaxial line 13, it is obvious that this phase shift will be substantially linear over the entire frequency range. For example, if $f_c$ is 70 megacycles, the system should theoretically by linear over a frequency band of 35 megacycles. In fact, upon building one broadband discriminator, as shown in FIG. 1, for a center frequency of 70 megacycles, the linearity remained within one percent (1%) over a frequency range of 20 megacycles as the signal frequency varied from 60 to 80 megacycles. The discriminator also had a sensitivity of approximately 30 millivolts per megacycle, and the group delay over the 20 megacycle band was so negligible as not to be measurable. Thus, it can be seen that by this unique combination of a wideband hybrid for producing sum and difference outputs and a nonresonant transmission line phase shifter, a broadband phase discriminator having negligible group delay and a high degree of linearity is achieved.

Although a number of specific embodiments of the invention have been shown, it will, of course, be understood that the invention is not limited thereto since many modifications, both in the instrumentalities and circuit arrangement employed, may be made. It is contemplated by the appended claims to cover any such modifications which fall within the true scope and spirit of this invention.

What is claimed as new and desired to be secured by Letters Patent of the United States is:

1. In a wideband demodulator for frequency modulated signals, the combination comprising:

(a) a wideband hybrid having two input ports and two output ports, the signals at said output ports being respectively the sum and difference of the signals applied to the input ports;

(b) means to apply a frequency modulated signal to one of said input ports;

(c) a linear phase shifting network which also receives said frequency modulated signal for shifting the phase of the signal by an odd multiple of ninety degrees (90°) at the center frequency of the signal and linearly by a lesser amount at frequencies below the center frequency and linearly by a greater amount at frequencies above the center frequency;

(d) means to couple the output of said phase shifting network to the other of the hybrid input ports whereby the sum and difference signals are equal in magnitude at the center frequency, the difference signal magnitude is greater at frequencies below the center frequency and the sum signal magnitude is greater at frequencies greater than the center frequency;

(e) detecting means coupled to each of said output ports for differentially detecting the sum and difference signals; and (f) output circuit means for receiving said detected signals to produce a varying unidirectional signal, the polarity of which varies with direction of the frequency deviation of the frequency modulated signal from the center frequency, and the magnitude of which is proportional to the amount of that deviation.

2. The demodulator, according to claim 1, wherein said wideband hybrid includes a plurality of distributed line transformers which are characterized by extended high frequency response and wideband performance.

3. In a linear wideband frequency discriminator, the combination comprising:

(a) an input terminal for receiving a frequency-modulated signal;

(b) a wideband distributed line network having two input ports for receiving said frequency modulated signal and two output ports, the signals at said output ports being respectively the sum and difference of the signals applied to the input ports;

(c) a nonresonant linear phase shifting network coupled to said input terminal for shifting the phase of the signal by an odd multiple of ninety degrees (90°) at the center frequency of the signal and linearly by lesser and greater amounts respectively at frequencies below and above the center frequency;

(d) means to couple the output of said phase shifting network to one input port and a means coupling the other input port to said input terminal to impress a frequency modulated signal on the other input port without any phase shift whereby the sum and difference signals at said output ports are equal in magnitude at the center frequency, the magnitude of the difference signal is greater at frequencies below and that of the sum signal greater at frequencies above the center frequency;

(e) detecting means coupled to each of said output ports for differentially detecting the sum and difference signals; and (f) a common output circuit for said detecting means to produce a unidirectional output, the polarity of which varies with the direction of frequency deviation of the frequency modulated signal from the center frequency and the magnitude of which is proportional to the magnitude of that deviation.

4. The linear wideband frequency discriminator, according to claim 3, wherein said linear phase shifting network includes a nonresonant transmission line having an electrical length at the center frequency to produce a phase shift equal to an odd multiple of ninety degrees (90°).

5. The linear wideband frequency discriminator, according to claim 4, wherein said transmission line has an electrical length which is equal to an odd multiple of a quarter wave length of the center frequency so that the signals at the input ports are in quadrature at that frequency.

6. The linear wideband frequency discriminator, according to claim 5, wherein said transmission line consists of a coaxial cable.

7. The linear wideband frequency discriminator, according to claim 3, wherein said phase shifting network includes a coaxial cable which is three-quarters of a wave length long at the center frequency of the frequency modulated signal.

References Cited

UNITED STATES PATENTS 3,364,430 1/1968 Goodman et al. ______ 329—116

ALFRED L. BRODY, *Primary Examiner.*